(12) United States Patent
McCann et al.

(10) Patent No.: US 7,551,604 B2
(45) Date of Patent: Jun. 23, 2009

(54) METHOD FOR REDUCING SERVICE INTERRUPTIONS DURING A HAND OFF IN A WIRELESS SYSTEM

(75) Inventors: Peter James McCann, Naperville, IL (US); Richard P. Ejzak, Wheaton, IL (US); Michael F. Dolan, Boilingbrook, IL (US); Frank M. Alfano, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1031 days.

(21) Appl. No.: 10/824,762

(22) Filed: Apr. 14, 2004

(65) Prior Publication Data

US 2005/0232198 A1    Oct. 20, 2005

(51) Int. Cl.
*H04L 12/66* (2006.01)
(52) U.S. Cl. ............... 370/352; 370/331; 455/439

(58) Field of Classification Search ............... 370/332, 370/333, 328, 329, 331, 351, 352; 455/437–443, 455/456.1, 456.6, 524, 525, 552.1, 574, 422.1, 455/436, 445, 450, 455.1
See application file for complete search history.

(56) References Cited

U.S. PATENT DOCUMENTS

| | | | |
|---|---|---|---|
| 6,735,202 B1 * | 5/2004 | Ahmed et al. | 370/392 |
| 2002/0001290 A1 * | 1/2002 | Bender et al. | 370/328 |
| 2003/0144001 A1 * | 7/2003 | Nakatsugawa et al. | 455/445 |
| 2003/0176187 A1 * | 9/2003 | Menzel et al. | 455/432.1 |
| 2005/0044130 A1 * | 2/2005 | Sillasto et al. | 709/200 |

* cited by examiner

*Primary Examiner*—Nhan T Le

(57) ABSTRACT

A method is provided for controlling communications to and from an access terminal during a hand off period. A smart packet filter is used to identify a packet flow, apply a first treatment to a packet flow based on its destination, and transmit the first treated packet flow along a first route to the access terminal. During a hand off, the packet stream is duplicated, a second treatment is applied to the packet flow and the second treated duplicate packet flow is transmitted to the access terminal via a second route.

14 Claims, 2 Drawing Sheets

METHOD FOR REDUCING SERVICE INTERRUPTIONS DURING A HAND OFF IN A WIRELESS SYSTEM

CROSS-REFERENCES TO RELATED APPLICATIONS

This application is related to applications: "Method of Handing Off A Packet Switched to a Circuit Switch Call," Ser. No. 10/823,667, "Method of Transferring a Packet Switched to a Circuit Switched Call," Ser. No. 10/823,580, "Method of Transferring Call Transition Messages Between Network Controllers of Different Radio Technologies," Ser. No. 10/823,579. These are filed concurrently herewith.

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of BSs (e.g., base stations) distributed within an area to be serviced by the system. Various users within the area, fixed or mobile, may then access the system and, thus, other interconnected telecommunications systems, via one or more of the BSs. Typically, an MS (e.g., a mobile station) maintains communications with the system as the user passes through an area by communicating with one and then another BS, as the user moves. The user may communicate with the closest BS, the BS with the strongest signal, the BS with a capacity sufficient to accept communications, etc. The process of transferring communications from one BS to another is commonly referred to as "hand off."

Additionally, a user may communicate with a BS using a variety of protocols that variously allow for the transmission of voice signals, low-speed data signals, high-speed data signals, and the like in a variety of formats. As a user operates, the type and quality of available protocols may vary. Thus, in some operations, it may be useful to switch between the various available protocols to provide the highest quality service to the user. The process of switching between these available protocols may also be referred to as "hand off."

During these hand off periods, it is common for information to be lost, and even for a connection to be lost entirely. In systems that transmit voice, or other data with real-time delivery constraints, the lost data can significantly impact the quality of the communications session. Also, as use of the Internet, e-mail and other data-intensive services have become ubiquitous, wireless communications systems are now attempting to provide some of these same services. These types of services require large amounts of data to be transmitted at relatively high speed. In a system that is intended to transmit large amounts of data at high speed, the lost data can be significant. In some cases, the lost data can impose substantial limits on the speed at which data can be transmitted, rendering high-speed data communications unworkable in some instances.

The present invention is directed to overcoming, or at least reducing, the effects of one or more of the problems set forth above.

SUMMARY OF THE INVENTION

In one aspect of the instant invention, a method is provided for controlling communications to an access terminal. The method comprises applying a first treatment to a packet flow and transmitting the first treated packet flow to the access terminal. During a hand off period, a second treatment is applied to a duplicate of the packet flow and the second treated packet flow is transmitted to the access terminal.

In one aspect of the instant invention, a method is provided for controlling communications from an access terminal. The method comprises applying a first treatment to a packet flow while attached to a first radio network controller; and applying a second treatment to a duplicate packet flow while attached to a second radio network controller during a hand off period.

BRIEF DESCRIPTION OF THE DRAWINGS

The invention may be understood by reference to the following description taken in conjunction with the accompanying drawings, in which like reference numerals identify like elements, and in which.

Figure 1:
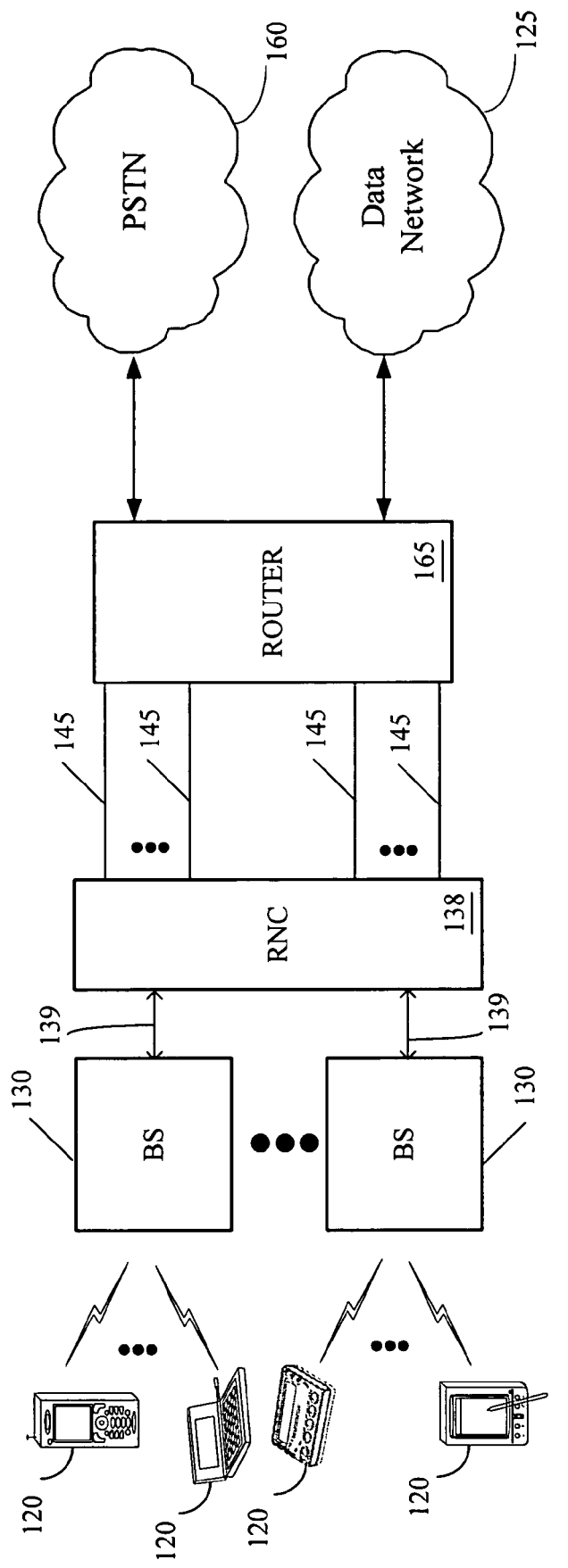
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is a cdma2000 access network, although it should be understood that the present invention may be applicable to other systems that support data and/or voice communication e.g., a Universal Mobile Telephone System (UMTS). The communications system 100 allows one or more MSs 120 to communicate with a data network 125, such as the Internet, through one or more BSs 130. The MS 120 may take the form of any of a variety of devices, including cellular phones, personal digital assistants (PDAs), laptop computers, digital pagers, wireless cards, and any other device capable of accessing the data network 125 through the BS 130.

In one embodiment, a plurality of the BSs 130 may be coupled to a Radio Network Controller (RNC) 138 by one or more connections 139, such as T1/E1 lines or circuits, ATM circuits, cables, optical digital subscriber lines (DSLs), and the like. Although one RNC 138 is illustrated, those skilled in the art will appreciate that a plurality of RNCs 138 may be utilized to interface with a large number of BSs 130. Generally, the RNC 138 operates to control and coordinate the BSs 130 to which it is connected. The RNC 138 of FIG. 1 generally provides replication, communications, runtime, and system management services. The RNC 138, in the illustrated embodiment handles calling processing functions, such as setting and terminating a call path and is capable of determining a data transmission rate on the forward and/or reverse link for each MS 120 and for each sector supported by each of the BSs 130.

The RNC 138 is also coupled to a Router 165 via a connection 145, which may take on any of a variety of forms, such as Ethernet, T1/E1 lines or circuits, ATM circuits, cables, optical digital subscriber lines (DSLs), and the like. One embodiment of the Router 165 is the Packet Data Serving Node (PDSN) in cdma2000. Another embodiment of the Router 165 is the Gateway GPRS Support Node (GGSN) in UMTS. Another embodiment of the Router 165 is a Serving GPRS Support Node (SGSN) in UMTS. Generally the Router 165 operates as an interface to a data network 125 and/or to a public telephone system (PSTN) 160. The Router 165 performs a variety of functions, including the routing of data and voice signals to their desired locations. A more detailed description of at least a portion of this routing process is described below in greater detail in conjunction with FIG. 2.

The data network 125 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Thus, those skilled in the art will appreciate that the communications system 100 facilitates communications between the MSs 120 and the data network 125. It should be understood, however, that the configuration of the communications system 100 of FIG. 1 is exemplary in nature, and that fewer or additional components may be employed in other embodiments of the communications system 100 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

The instant invention may find application in any of a variety of environments where a communications network is configured to communicate with an access terminal through more than one protocol, and, consequently, there is a period of time in which a hand off occurs from one protocol to another. For example, in wireless networks, there is often a period of time during the hand off of a session when application packet data flows, such as VoIP data flows, are temporarily interrupted as the mobile terminal tunes to a new frequency and/or reconfigures itself to handle the flow of data in a way that is different than before the hand off. As used herein, a "packet data flow" refers to the packets that pass through a given portion of the wireless network. In some cases, the service interruption may result in a lost call. The instant invention is useful at reducing these service interruptions by allowing the bi-casting of the packet data stream in both frequencies and formats. This also has the added benefit of reducing recurrent service interruptions in the cases where the mobile terminal moves back and forth between base stations, sometimes referred to as ping ponging.

In one embodiment of the instant invention, smart packet filters are used to route the bi-cast data streams to their desired locations. Generally, packet filters match on information in the packet, and the network entity monitoring the flow, such as a router, may perform a treatment identified in an instruction in the packet filter. As used herein, a "treatment" refers to any operation applied to the packet and/or portions thereof. For example, routing, filtering, compressing, appending, and the like may be considered "treatments." Packet filters are functional software entities that instruct another entity, such as a router, on an IP bearer path regarding how to treat the flow of packets that matches characteristics identified in the packet filter. For example, the packet filter may instruct a router to treat packets identified by a destination port of "1234" in the following way: compress the headers using header compression technique HC1; and direct the flow of packets on the IP bearer identified as B1.

In one embodiment of the instant invention, intelligence within the packet filters allows the treatment of packets flows to be optimized for the current environment, including in some cases, multiple simultaneous treatments. For example, in a mobile wireless environment, a dual radio technology terminal may be moving toward the coverage edge of one radio technology (R1) into an area covered by a different radio technology (R2). The smart packet filter instructs a router, which has a link to both radio technologies, regarding: the preferred radio technology for the access terminal; the configuration to use when the access terminal is in radio technology R1; the configuration to use when the access terminal is in radio technology R2; and how to treat the flow when handing off/over from R1 to R2.

The access terminal maintains multiple tables that describe the flows that will be delivered from and to each of the radio technology specific base stations involved in the hand off/over. These tables are useful in that they allow the access terminal to "know" how packets will be delivered to the access terminal in the forward (downlink) direct; and how to treat (and route) the packets that will be delivered in the reverse (uplink) direction.

Figure 2:
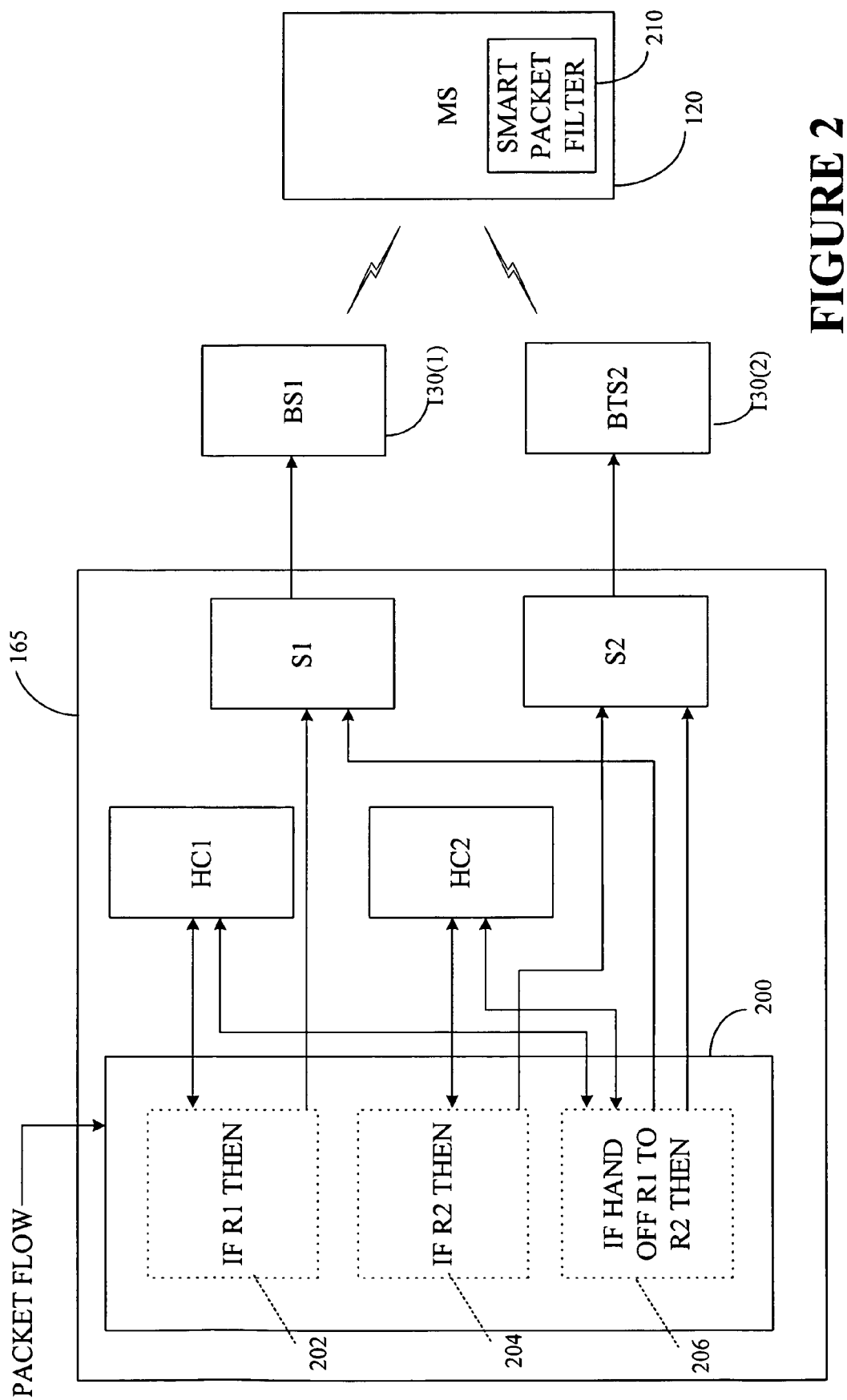
FIG. 2 depicts a block diagram of one embodiment of a router used in the communications system of FIG. 1.

Referring now to FIG. 2, a block diagram of one embodiment of a functional structure associated with the router 165 is shown. Generally, FIG. 2 illustrates how a smart packet filter will handle an inter-technology hand off. The smart packet filter utilizes the following exemplary mapping instructions:

the access terminal prefers radio technology R1;

when using radio technology R1, use compression C1 and send the packets via service S1;

when using radio technology R2, use compression C2 and send the packets via service S2;

when handing off/over from radio technology R1 to radio technology R2, send the packets via service S1 and S2 (bi-cast) using the radio technology specific information.

Those skilled in the art will appreciate that substantially similar smart packet filter information exists in a smart packet filter in the access terminal. The terminal applies a treatment to the packets of the packet flow based on the information in the smart packet filter and the radio technology environment in which the access terminal exists at any point in time.

In FIG. 2, an application IP packet flow destined for the access terminal 120 arrives at the router 165. The router 165 determines from IP header information in the packet that the packet flow is to be sent to the access terminal 120 on a particular port. Using information contained in the packet flow, such as in the packet header, the router 165 identifies the packet filter 200 associated with the packet flow. The router 165 utilizes its knowledge of the radio technology to perform packet treatments as instructed via radio technology specific information in the smart packet filter. Exemplary packet treatments may include a compression technique, such as PPP payload compression (described in RFC 1962, RFC 1967, RFC 1974, RFC 1975, RFC 1976, RFC 1977, RFC 1978, and/or RFC 1979); or, a header compression technique such as Van Jacobson Header Compression (RFC 1144), IP Header Compression (RFC 2509 and/or RFC 3544), Compressed RTP (RFC 2508), Enhanced Compressed RTP (RFC 3545), Robust Header Compression (ROHC, RFC 3095), Link-Layer Assisted ROHC (RFC 3242), Header Removal (described in 3GPP2 C.S0047 and X.P0011-C). A packet treatment might also be a level of Quality-of-Service such as a minimum bandwidth, maximum delay bound, or maximum loss rate. A packet treatment might also be a mapping onto a particular service instance connection or packet data protocol context.

In the exemplary representation of FIG. 2, as discussed above, the smart packet filter 200 has been instructed to use compression C1 and send the packets via service S1 when using radio technology R1. Thus, the smart packet filter at 202 identifies packet flow as being associated with radio technology R1 and routes the data packets to HC1 for compression. These compressed packets are then delivered via the service S1 to BTS1 130(1) and transmitted to the access terminal 120. Similarly, the smart packet filter 200 has been instructed to use compression C2 and send the packets via service S2 when using radio technology R2. Thus, when the access terminal 120 is using radio technology R2, the smart packet filter at 204 identifies the packet flow as being associated with radio technology R2 and routes the data packets to HC2 for compression. These compressed packets are then delivered via the service S2 to BTS2 130(2) and transmitted to the access terminal 120.

When the access terminal 120 moves to a geographic location where the coverage of radio technology R1 is diminishing and the coverage of radio technology R2 is increasing, the router 165 is informed that a hand off/over will occur from radio technology R1 to radio technology R2. The smart packet filter 200 at 206 instructs the router 165 to duplicate the packet stream, provide both radio technology treatments to the packets, and bi-cast the packets to both radio technology bases stations 130(1), 130(2).

The access terminal 120 receives the packet flow per the radio technology instruction in the smart packet filter 210 for the radio technology that the access terminal 120 is currently using. When the access terminal 120 switches to the new radio technology (R2 in this example), it expects to receive the flow of packets as instructed for that technology in its smart packet filter 210.

Although the invention has been described herein in conjunction with a hand off/over from one radio technology to a different radio technology, those skilled in the art will appreciate that the instant invention admits to wider application. For example, smart packet filters may be employed when hading off between base stations with the same radio technology but with different sets of capabilities. The smart packet filters may specify a preference for one treatment over another when both treatment capabilities exist.

Those skilled in the art will appreciate that the various system layers, routines, or modules illustrated in the various embodiments herein may be executable control units. The controllers may include a microprocessor, a microcontroller, a digital signal processor, a processor card (including one or more microprocessors or controllers), or other control or computing devices and may access information contained in various storage devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers 210, 250 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for controlling communications to an access terminal, comprising:

applying a first treatment to a packet flow and transmitting the first treated packet flow to a first base station for transmission over an air interface to the access terminal, wherein the first treatment is selected based on a first radio technology implemented by the first base station; and applying a second treatment to a duplicate of the packet flow and transmitting the treated duplicate packet flow to a second base station for transmission over the air interface to the access terminal during a hand off period in which the access terminal is handing off from the first base station to the second base station, and wherein transmission of the first treated packet flow to the first base station occurs concurrently with transmission of the treated duplicate packet flow to the second base station, and wherein the second treatment is selected based on a second radio technology implemented by the second base station; and wherein the first and second treatments are maintained in a data structure in a router, wherein the data structure indicates a mapping between the first and second treatments and information in the packet flow, and wherein applying the first treatment to the packet flow comprises selecting the first treatment using information in the packet flow and the data structure.

2. The method of claim 1 wherein the data structure is maintained or updated according to commands or instructions from one or more radio network controllers.

3. The method of claim 2 wherein the first treatment is selected to optimize performance for packet flows destined to the first base station and the second treatment is selected to optimize performance for packet flows destined to the second base station.

4. The method of claim 1 wherein the data structure is maintained or updated according to commands or instructions from the access terminal.

5. The method of claim 1 wherein the first treatment is removed from the data structure after the completion of the hand off from a first base station to a second base station.

6. The method of claim 1 where the first treatment remains resident in the data structure after the completion of the hand off from a first base station to a second base station, so that it remains available for use in the event of a ping pong hand off back to the first base station.

7. The method of claim 1 where the first and second treatments comprise at least one of a compression technique, a quality of service specification, a service instance mapping, and a packet data protocol context mapping.

8. A method of controlling communications from an access terminal, comprising:

applying a first treatment to a packet flow while attached to a first base station, wherein the first treatment is selected based upon a first radio technology implemented by the first base station;

applying a second treatment to a duplicate packet flow while attached to a second base station during a hand off period in which the access terminal is handing off from the first base station to the second base station, and wherein the first treated packet flow is transmitted to the first base station concurrently with transmission of the treated duplicate packet flow to the second base station, and wherein the second treatment is selected based upon a second radio technology implemented by the second base station; and wherein the first and second treatments are maintained in a data structure within the access terminal, wherein the data structure indicates a mapping between the first and second treatments and information in the packet flow, and wherein applying the first treatment to the packet flow comprises selecting the first treatment using information in the packet flow and the data structure.

9. The method of claim 8 wherein the data structure is maintained according to commands or instructions from one or more radio network controllers.

10. The method of claim 9 wherein the data structure is maintained according to commands or instructions from one or more routers.

11. The method of claim 10 wherein the first treatment is selected to optimize performance for packet flows destined to the first base station and the second treatment is selected to optimize performance for packet flows destined to the second base station.

12. The method of claim 9 where the first treatment remains resident in the data structure after the completion of the hand off from a first base station to a second base station, so that it remains available for use in the event of a ping pong hand off back to the first base station.

13. The method of claim 8 wherein the first treatment is removed from the data structure after the completion of the hand off from a first base station to a second base station.

14. The method of claim 8 wherein the first and second treatments comprise one or more of a compression technique, a quality of service specification, a service instance mapping, or a packet data protocol context mapping.

* * * * *